US012274268B2

(12) United States Patent
Shapiro Ilan et al.

(10) Patent No.: US 12,274,268 B2
(45) Date of Patent: Apr. 15, 2025

(54) METHODS AND COMPOSITIONS FOR INCREASING INFECTIVITY OF ENTOMOPATHOGENIC NEMATODES

(71) Applicants: The United States of America, as represented by the Secretary of Agriculture, Washington, DC (US); Pheronym Inc, Davis, CA (US)

(72) Inventors: David I. Shapiro Ilan, Macon, GA (US); Fatma Kaplan, Davis, CA (US)

(73) Assignees: The United States of America, as represented by the Secretary of Agriculture, Washington, DC (US); Pheronym Inc., Davis, CA (US)

( * ) Notice: Subject to any disclaimer, the term of this patent is extended or adjusted under 35 U.S.C. 154(b) by 385 days.

(21) Appl. No.: 16/800,745

(22) Filed: Feb. 25, 2020

(65) Prior Publication Data
US 2020/0281213 A1    Sep. 10, 2020

Related U.S. Application Data

(60) Provisional application No. 62/814,364, filed on Mar. 6, 2019.

(51) Int. Cl.
*A01N 63/12* (2020.01)

(52) U.S. Cl.
CPC .................................. *A01N 63/12* (2020.01)

(58) Field of Classification Search
CPC ..................................................... A01N 63/12
See application file for complete search history.

(56) References Cited

U.S. PATENT DOCUMENTS

| | | | |
|---|---|---|---|
| 7,374,773 B1 | 5/2008 | Shapiro-Ilan et al. | |
| 8,318,146 B1 | 11/2012 | Teal et al. | |
| 10,736,326 B2 * | 8/2020 | Kaplan | A01N 25/04 |
| 2014/0364386 A1 | 12/2014 | Choe et al. | |
| 2018/0343873 A1 | 12/2018 | Kaplan | |

FOREIGN PATENT DOCUMENTS

| | | | |
|---|---|---|---|
| CN | 102640731 A | 8/2012 | |
| WO | 2014145380 A2 | 9/2014 | |
| WO | WO-2017120252 A1 * | 7/2017 | ............. A01N 25/04 |

OTHER PUBLICATIONS

U.S. Appl. No. 16/981,995 (Year: 2018).*
Zhao, L., Zhang, X., Wei, Y. et al. Ascarosides coordinate the dispersal of a plant-parasitic nematode with the metamorphosis of its vector beetle. Nat Commun 7, 12341 (2016). https://doi.org/10.1038/ncomms12341 (Year: 2016).*
Savant SpeedVac product page, https://www.thermofisher.com/order/catalog/product/SC210A-230 (Year: 2024).*
Rotary evaporator, Wikipedia, https://en.wikipedia.org/wiki/Rotary_evaporator (Year: 2024).*
Zhang X, Noguez JH, Zhou Y, Butcher RA. Analysis of ascarosides from Caenorhabditis elegans using mass spectrometry and NMR spectroscopy. Methods Mol Biol. 2013; 1068:71-92. doi: 10.1007/978-1-62703-619-1_6. PMID: 24014355; PMCID: PMC3947767 (Year: 2013).*
Kaplan et al.; Interspecific Nematode Signals Regulate Dispersal Behavior; PLoS ONE, Jun. 2012, vol. 7, Issue 6, pp. 1-8.
Oliveira-Hofman et al.; Pheromone extracts act as boosters for entomopathogenic nematodes efficacy; Journal of Invertebrate Pathology 164 (2019), pp. 38-42.
David I. Shapiro et al.; Comparision of Entomopathogenic Nemotide Infectivity from Infected Hosts Versus Aqueous Suspension; Enviromental Entomology, vol. 28, No. 5 (1999), pp. 907-911.
David I. Shapiro et al.; Comparision of Entomopathogenic Nematode Dispersal from Infected Hosts Versus Aqueous Suspension; Enviromental Entomology, vol. 25, No. 6 (1996), pp. 1455-1461.
David I. Shapiro et al.; Basic and Applied Research: Entomopathogenic Nematodes; Microbial Control of Insect and Mite Pests, Chapter 6 (2017), pp. 91-105.
David I. Shapiro et al.; Conspecific pheromone extracts enhance entomopathogenic infectivity; Journal of Nematology, vol. 51 (2019), pp. 1-5.
Wu et al.; Infected host macerate enhances entomopathogenic nematode movement towards hosts and infectivity in a soil profile; Journal of Invertebrate Pathology 159 (2018), pp. 141-144.
International Search Report, Jun. 29, 2020.
Grewal, P. S., R-U Ehlers, and D. I. Shapiro-Ilan (Eds.), "Nematodes as Biocontrol Agents," 2005, CABI Publishing, 505 pp.
Salame, L., et al., 2010 "Characterization of populations of entomopathogenic nematodes isolated at diverse sites across Israel," Phytoparasitica 38(1): 39-52.
Waters, J.M. and Fraser, C.I., 2016, Dispersal Biogeography. Encyclopedia of Evolutionary Biology, vol. 1, 453-457.
Ruan, W., et al., 2018, "Movement patterns in entomopathogenic nematodes: continuous vs. temporal," J. Invertebr. Pathol. 151: 137-149.
Shapiro, D. I. and I. Glazer., 1996, "Comparison of Entomopathogenic Nematode Dispersal from Infected Hosts Versus Aqueous Suspension" Environ. Entomol. 25:1455-1461.
Shapiro-Ilan D.I. , et al., 2019, "Conspecific pheromone extracts enhance entomopathogenic infectivity," J. Nematology 51: e2019-82.

(Continued)

*Primary Examiner* — Ruth A Davis
(74) *Attorney, Agent, or Firm* — John Fado; Maria Restrepo-Hartwig

(57) ABSTRACT

Disclosed are methods for increasing infectivity of entomopathogenic nematodes in any target area for the purposes of insect control, said method comprising:
(a) mixing an aqueous nematode infectivity increasing composition with (i) entomopathogenic nematodes to activate said entomopathogenic nematodes for increased infectivity prior to application of said entomopathogenic nematodes to said target area, or (ii) seeds to produce coated seeds, and
(b) applying said entomopathogenic nematodes to said target area or planting said coated seeds in said target area;
wherein said aqueous nematode infectivity increasing composition is produced by methods disclosed herein.

6 Claims, 4 Drawing Sheets

(56) References Cited

OTHER PUBLICATIONS

Figure 2A:
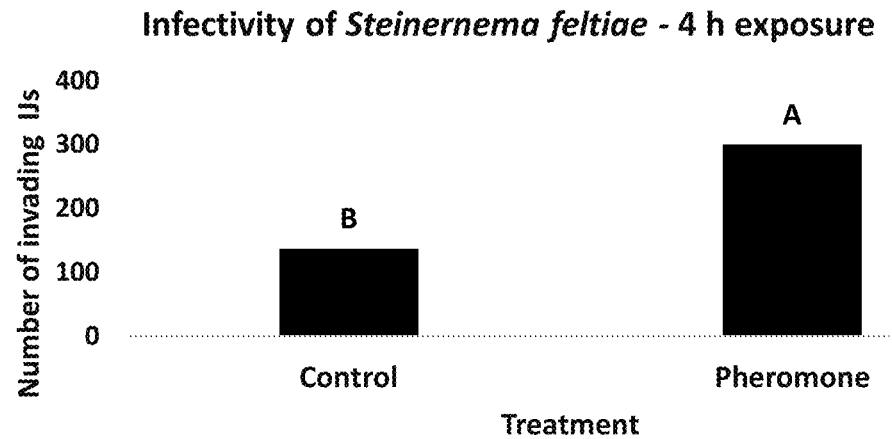

W.A. Steiner, 1996, "Dispersal and host-finding ability of entomopathogenic nematodes at low temperatures," Nematologica 42: 243-261.
International Search Report application No. 20 766 542.3, Date: N/A.

\* cited by examiner

FIG. 1A

**Infectivity of *Steinernema carpocapsae* - 4 h exposure**

FIG. 1B

**Infectivity of *Steinernema carpocapsae* - 24 h exposure**

METHODS AND COMPOSITIONS FOR INCREASING INFECTIVITY OF ENTOMOPATHOGENIC NEMATODES

REFERENCE TO RELATED APPLICATION

This application claims the benefit of U.S. Provisional Application No. 62/814,364 filed 6 Mar. 2019, which is incorporated herein by reference in its entirety.

BACKGROUND OF THE INVENTION

Disclosed are methods for increasing infectivity of entomopathogenic nematodes in any target area for the purposes of insect control, said method comprising:
(a) mixing an aqueous nematode infectivity increasing composition with (i) entomopathogenic nematodes to activate said entomopathogenic nematodes for increased infectivity prior to application of said entomopathogenic nematodes to said target area, or (ii) seeds to produce coated seeds, and
(b) applying said entomopathogenic nematodes to said target area or planting said coated seeds in said target area;
wherein said aqueous nematode infectivity increasing composition is produced by a method comprising:
(i) obtaining a nutrient depleted nematode growth medium selected from the group consisting of liquid broth, agar medium or other solid substrate, and insect host cadaver, depleted of nutrients by growing entomopathogenic nematodes;
(ii) producing an alcohol-growth medium mixture by adding an alcohol to said growth medium to achieve a final concentration of between about 10% to about 90% of said alcohol in said growth medium;
(iii) centrifuging said alcohol-growth medium mixture to remove solid or insoluble matter while maintaining a supernatant from said centrifuging;
(iv) drying the supernatant from said centrifuging to produce a dry extract;
(v) resuspending said dry extract in an aqueous medium to produce a water-soluble pheromone extract; and
(vi) centrifuging said water-soluble pheromone extract to remove water-insoluble compounds while maintaining a water soluble supernatant to produce an aqueous nematode infectivity increasing composition; and
(vii) optionally drying said aqueous nematode infectivity increasing composition to produce a dry nematode infectivity increasing composition and subsequently dissolving said dry nematode infectivity increasing composition in an aqueous medium to produce an aqueous nematode infectivity increasing composition.

Entomopathogenic nematodes (genera: *Heterorhabditis* and *Steinernema*) are potent biocontrol agents that are used to control a wide variety of economically important insect pests (Shapiro-Ilan, D. I., et al., Basic and Applied Research: Entomopathogenic Nematodes, IN: Lacey, L. A. (Ed.), Microbial Agents for Control of Insect Pests: from discovery to commercial development and use, 2017, Academic Press, Amsterdam, pp. 91-105). The nematodes occur naturally in the soil and kill insect hosts with the aid of symbiotic bacteria (*Xenorhabdus* bacteria are associated with steinernematid nematodes and *Photorhabdus* bacteria are associated with heterorhabditid nematodes). Despite the commercial success of entomopathogenic nematodes (EPNs) as biological control agents, field efficacy is often variable, and therefore research toward improvement is needed (Shapiro-Ilan, D. I., et al., 2017). Methods to enhance biocontrol efficacy in EPNs include strain improvement as well as improving nematode production, formulation, and application technology (Shapiro-Ilan, D. I., et al., 2017).

To cause insect mortality, and thereby reduce pest populations, the nematodes must move to the host and successfully infect (invade) it. Therefore, two aspects of EPN biology that contribute significantly to biocontrol efficacy include nematode dispersal and infectivity. Prior research indicates that certain EPN-infected host substances enhance nematode dispersal (Shapiro, D. I., and I. Glazer, Environmental Entomology, 25: 1455-1461 (1996)). Separately, EPN-infected host substances were shown to enhance nematode infectivity (propensity to invade the host) (Shapiro, D. I., and E. E. Lewis, Environmental Entomology, 28: 907-911 (1999)). Dispersal-inducing compounds in steinernematid nematodes were later described as specific mixtures of ascaroside pheromones (Kaplan, F., et al., PLoS ONE, 7(6): e38735 (2012)). These nematode pheromones, called ascarosides, are composed of a central ascarylose sugar with a variable lipid side chain; both the lipid chain and ascarylose sugar can have modifications. Presumably due to these dispersal pheromones, crude macerate of EPN-infected hosts was shown to enhance EPN dispersal in a soil profile (Wu, S., et al., Journal of Invertebrate Pathology, 159: 141-144 (2018)). Subsequently, as expected, isolated dispersal pheromones extracts enhanced movement of *S. carpocapsae* and *S. feltiae* in soil columns as well (Oliveira-Hofman, C., et al., J. Invertebr. Pathol., 164, 38-42. (2019)). Prior to our research, it was not known whether EPN dispersal pheromones might also enhance other nematode behaviors that would contribute to biocontrol success (such as infectivity). The objective of this study was to determine if conspecific dispersal pheromones increases infectivity of *S. carpocapsae* and *S. feltiae*. *S. carpocapsae* and *S. feltiae* have different foraging strategies (ways of finding the host insect) (Shapiro-Ilan, D. I., et al., 2017), so the test encompasses two foraging types of steinernematids. Foraging types exist on a continuum from ambusher (the nematodes sit in one place standing on their tail and then "ambush" an insect host when it passes by) to cruisers (the nematodes actively seek hosts by moving continuously through the soil profile). A number of nematodes are also considered to be intermediate foragers; they exhibit traits of both ambushers and cruisers. We wanted to determine whether the pheromones would increase infectivity of *Steinernema* spp. with different foraging strategies, so we selected *S. carpocapsae* and *S. feltiae*. *S. carpocapsae* is an ambusher, whereas *S. feltiae* is an intermediate forager. Both nematode species are commercially available.

SUMMARY OF THE INVENTION

This patent disclosure provides a nematode growth medium extract (dry or liquid) to treat entomopathogenic nematodes prior to field or controlled plant growth environment (e.g., greenhouse, indoor agriculture) application for improved infectivity, including a pheromone extract of nematode growth medium which increases infectivity of entomopathogenic nematodes for improved nematode field efficacy. Methods of manufacture, including purification, storage as dry powder, and use are disclosed for optimal preservation and use of the nematode infectivity activity.

The infectivity behavior of entomopathogenic nematodes disclosed herein is surprisingly controlled by pheromones. It is not obvious that infectivity increasing pheromones are found in nematode growth medium. Since infectivity activity is labile, prior to our disclosure, it was not known how to obtain the infectivity signal, how to preserve the activity, or how to deploy the activity to commercial advantage.

Treatment with crude pheromone increase infectivity of entomopathogenic nematodes, which improves host insect mortality. The pheromone composition disclosed and claimed herein was partially purified from nematode growth medium, including but not limited to, insects (hosting entomopathogenic nematodes), liquid broth, or agar plates. The pheromones were extracted using an alcohol, such as but not limited to, 70% methyl alcohol, ethyl alcohol, or combinations thereof, and insoluble debris were removed (e.g., by centrifugation). The pheromone can be extracted with a range of concentration from about 10% to about 95% alcohol. The liquid (supernatant) was removed and concentrated to produce a dry extract, for example, by using a stream of nitrogen, by lyophilization, or by equivalent means. The dry powder was resuspended in water and insoluble debris were separated (e.g., by centrifugation) from water-soluble pheromones. The supernatant was concentrated to dryness, for example using a lyophilizer or equivalent means for storage. In liquid storage, the activity was lost within 3 weeks at −20° C. and at a faster rate at ambient temperatures. We have discovered, however, that drying the extract preserves the activity of the water-soluble partially purified pheromone blend. The ratio of this pheromone mixture was important for the activity. When the extract was diluted up to 3 times it produced increased infectivity, but the activity was diminished upon further dilution. For example, 1 insect host extract from *Galleria mellonella* (average weight of *G. mellonella* larvae, wax worm, is estimated to be 200 microL (microliters) or 232+/−57 mg) is diluted in 200 microL water up to 600 microL water. A commercial package of 5 million insect nematodes would require production of an extract from about 200 *G. mellonella* diluted to between about 40 ml and 120 ml. The extracts are not limited to *G. mellonella*. Insect host preinfected weight is considered 1:1 for extract dilution and up to 3 times of the original weight of the extract is active. For the liquid broth, a 1 L (liter) growth medium where the food (as bacteria) density goes down and nematode density goes up and the infective juveniles (IJs) or analogous life stage (e.g., dauer in *C. elegans*) forms, the media contains infectivity increasing pheromone. One L liquid broth extract (dry powder) is diluted with 1 L water up to 3 L of water. A package of commercial insect nematodes (5 million nematodes) is preferably exposed to about 100 ml of the extract from liquid growth medium. The powder is resuspended with nematodes to increase the infectivity of the nematodes before spraying the nematodes in a field or greenhouse. According to one embodiment of the invention, nematodes are treated with resuspended powder for at least about 15-30 min (minute), and most preferably for about 20 min, prior to field or greenhouse applications. In alternate embodiments, the resuspended extract is mixed with nematodes as the nematodes are applied to the field or greenhouse.

The most potent nematode infectivity increasing composition we have tested was partially purified pheromone extract from nematode growth medium (liquid broth or insect host cadavers).

The partial purification methods include a drying stage for storage. We have found that the infectivity increasing activity is rapidly lost in aqueous solution. However, drying the extracts preserves the activity. Therefore, partially purified pheromone extract is one composition according to this invention which is dried to preserve the infectivity increasing activity.

Disclosed are methods for increasing infectivity of entomopathogenic nematodes in any target area for the purposes of insect control, said method comprising:

(a) mixing an aqueous nematode infectivity increasing composition with (i) entomopathogenic nematodes to activate said entomopathogenic nematodes for increased infectivity prior to application of said entomopathogenic nematodes to said target area, or (ii) seeds to produce coated seeds, and (b) applying said entomopathogenic nematodes to said target area or planting said coated seeds in said target area;

wherein said aqueous nematode infectivity increasing composition is produced by a method comprising:

(i) obtaining a nutrient depleted nematode growth medium selected from the group consisting of liquid broth, agar medium or other solid substrate, and insect host cadaver, depleted of nutrients by growing entomopathogenic nematodes;

(ii) producing an alcohol-growth medium mixture by adding an alcohol to said growth medium to achieve a final concentration of between about 10% to about 90% of said alcohol in said growth medium;

(iii) centrifuging said alcohol-growth medium mixture to remove solid or insoluble matter while maintaining a supernatant from said centrifuging;

(iv) drying the supernatant from said centrifuging to produce a dry extract;

(v) resuspending said dry extract in an aqueous medium to produce a water-soluble pheromone extract; and (vi) centrifuging said water-soluble pheromone extract to remove water-insoluble compounds while maintaining a water soluble supernatant to produce an aqueous nematode infectivity increasing composition; and (vii) optionally drying said aqueous nematode infectivity increasing composition to produce a dry nematode infectivity increasing composition and subsequently dissolving said dry nematode infectivity increasing composition in an aqueous medium to produce an aqueous nematode infectivity increasing composition.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Exemplary FIG. 1A shows number of infective juvenile *S. carpocapsae* invading the insect host (*Galleria mellonella*) after 4 h and FIG. 1B shows number of infective juvenile *S. carpocapsae* invading the insect host (*Galleria mellonella*) after 24 h exposure with or without the nematode infectivity increasing composition as described below.

Exemplary FIG. 2A shows number of infective juvenile *S. feltiae* invading the insect host (*Galleria mellonella*) after 4 h and FIG. 2B shows number of infective juvenile *S. feltiae* invading the insect host (*Galleria mellonella*) after 24 h exposure with or without the nematode infectivity increasing composition as described below.

Exemplary FIG. 3 shows number of *S. carpocapsae* or *Steinernema* feltiae invading the insect host (*Diaprepes abbreviatus*) after 24 h exposure with or without the nematode infectivity increasing composition as described below.

Exemplary FIG. 4 shows a concentration-response curve for IJs (infective juvenile nematodes, *Steinernema* feltiae)

invading the host insect (*Galleria mellonella*) after 24 h exposure as described below. The number of invaders was measured following exposure to pheromone extracts at concentrations of 0 (control) to 4× times the standard concentration (1×).

DETAILED DESCRIPTION OF THE INVENTION

Methods of making and using the nematode infectivity increasing composition according to this invention are described in detail herein below and are supported by the Examples provided herein.

Disclosed are methods for increasing infectivity (invasiveness of insect host) of entomopathogenic nematodes in any target area for the purposes of insect control (e.g., fields, greenhouses, orchards, perennial crops, home gardens, lawns, structures, indoor agriculture, coating seeds), said method comprising:
  (a) mixing an aqueous nematode infectivity increasing composition with (i) entomopathogenic nematodes to activate said entomopathogenic nematodes for increased infectivity prior to application of said entomopathogenic nematodes to said target area, or (ii) seeds to produce coated seeds, and
  (c) applying said entomopathogenic nematodes to said target area or planting said coated seeds in said target area;
  wherein said nematode infectivity increasing composition is produced by a method comprising:
  (i) obtaining a nutrient depleted nematode growth medium selected from the group consisting of liquid broth, agar medium or other solid substrate (e.g., sponge), and insect host cadaver, depleted of nutrients by growing entomopathogenic nematodes (e.g., genera: *Heterorhabditis* and *Steinernema*) to stasis in said growth medium (e.g., any form or solid or liquid fermentation including in Petri dishes, shake flasks, mass solid culture, or bioreactors);
  (ii) producing an alcohol-growth medium mixture by adding an alcohol to said growth medium to achieve a final concentration of between about 10% to about 90% of said alcohol in said growth medium (e.g., 70% methanol, 30% water);
  (iii) centrifuging said alcohol-growth medium mixture to remove solid or insoluble matter while maintaining a supernatant from said centrifuging;
  (iv) drying the supernatant from said centrifuging to produce a dry extract;
  (v) resuspending said dry extract in an aqueous medium (e.g., purified water (deionized water and then go through a water purifier system to remove the rest of the impurities including microorganisms, organic acids, etc., in the past it was called HPLC pure water or MilliQ water) to produce a water-soluble pheromone extract;
  (vi) centrifuging said water-soluble pheromone extract to remove water-insoluble compounds while maintaining a water soluble supernatant to produce an aqueous nematode infectivity increasing composition; and
  (vii) optionally drying (e.g., freeze drying) said aqueous nematode infectivity increasing composition to produce a dry nematode infectivity increasing composition and subsequently dissolving (before step (a) above) said dry nematode infectivity increasing composition in an aqueous medium to produce an aqueous nematode infectivity increasing composition.

Coating seeds means the nematode infectivity increasing composition is put on the seed coat and increases the infectivity of the entomopathogenic nematodes in soil when the seeds are planted in the field (e.g., for row crops such as corn, soybean, sugar beets, wheat, cotton, rice). It is also possible to coat the seeds with the nematode infectivity increasing composition and also nematodes. Planting the coated seeds increases the infectivity of the entomopathogenic nematodes on the seeds and in the soil.

Delivery of the nematode infectivity increasing composition can be done by at least 5 different methods: (1) as a pretreatment to the entomopathogenic nematodes directly in water before nematode application; (2) the nematode infectivity increasing composition can be coated on seeds which are planted in soil, entomopathogenic nematodes would be exposed to pheromones when the seeds are planted and watered; (3) both nematode infectivity increasing composition and entomopathogenic nematodes are coated to the seeds which are dehydrated, when the seeds are planted and watered, the nematodes would get the pheromone exposure around the seed to protect seedlings from insects; (4) add the nematode infectivity increasing composition to a bait (target area) that includes the entomopathogenic nematodes; (5) injecting into phloem or xylem of the trees (target area) along with entomopathogenic nematodes.

Delivery of nematode infectivity increasing composition pretreated nematodes may be done, for example, with irrigation system (drip irrigation or others), aerial sprays to cover plant surfaces, spray systems, baits, and in any formulation.

Any entomopathogenic nematode after exposure to infectivity-enhancing pheromones may be used against their host insects.

Non-limiting description of nematodes and insect hosts to which the present invention is applicable include the following: Commercially available nematodes: Insect nematodes, entomopathogenic nematodes, in the genera *Heterorhadbitis* and *Steinernema* species such as sp *S. carpocapsae, S. feltiae, S. kraussei, S. glaseri, S. scapterisci, S. riobrave, S. kushidai, S scarabaei* or *H. bacteriophora, H. megidis, H. indica, H. zeaiandica, H. downesi, H. marelata.*

The entomopathogenic nematodes collectively control a wide array of insect pests in the orders Lepidoptera, Coleoptera, and Diptera as well as insects in Siphonaptera, Hemiptera, and other orders as well. For example, insects that are controlled by nematodes: Artichoke plume moth, Armyworms, Banana moth, Banana root borer, Billbug, Black cutworm, Black vine weevil, Borers, Cat flea, Chinch bugs, Citrus root weevil, Codling moth, Corn earworm, Corn rootworm, Cranberry girdler, Crane fly, Diaprepes root weevil, Fungus gnats, Grape root borer, Iris borer, Large pine weevil, Leafminers, Mole crickets, Navel orangeworm, Plum curculio, Scarab grubs, Shore flies, Strawberry root weevil, Small hive beetle, Sod webworms, Sweetpotato weevil.

For example: *S. carpocapsae* controls insect pests such as cutworms, armyworms, billbugs, cranberry girdler, peachtree borer, fleas, chinch bug, black vine weevil, strawberry root weevil, webworm and artichoke plume moth. *S. feltiae* is sold widely for control of *Thrips*, fungus gnats, codling moth, larvae of vine weevils and sciarids. *S. kraussei* seek out suitable hosts by swimming in the thin film of water on soil particles. *H. bacteriophora* controls *Otiorhyncus sulcatus*, Black Vine Weevil, larvae feeding on roots in the soil and chafer grubs.

In light of the foregoing disclosure, those skilled in the art will appreciate that this invention includes a method for obtaining an entomopathogenic nematode (EPN) infectivity increasing composition by obtaining a nutrient depleted EPN growth medium selected from liquid broth, agar medium, and insect host cadaver, depleted of nutrients by growing said EPN to stasis in said growth medium. From the growth medium (e.g., with insect host cadavers), alcohol is added to the cadavers because the volume is very small; with liquid broth, it can be first frozen and then lyophilized because the initial volume is large, and then extracted with alcohol), producing an alcohol-growth medium mixture by adding an alcohol to the growth medium to achieve a final concentration of between about 10% to about 95% of the alcohol in the growth medium. The alcohol-growth medium mixture is centrifuged to remove solid or insoluble matter while maintaining a supernatant from the centrifugation step. Preferably, the supernatant from the centrifuging step is dried to produce a dry extract. The dry extract is then, preferably, resuspended in water or equivalent aqueous medium to produce a water soluble pheromone extract. The water soluble pheromone extract is preferably again centrifuged to remove water/aqueous medium insoluble compounds while maintaining a water soluble supernatant. To preserve the activity, the supernatant from this centrifugation step is dried to produce a dry EPN infectivity increasing composition.

In a preferred embodiment, the alcohol is selected from the ethanol, methanol and mixtures thereof. In another preferred embodiment, the growth medium is selected from a growth medium in which non-pathogenic bacterivore nematodes or insect or entomopathogenic nematodes have been grown.

According to this invention, the nematode infectivity increasing composition is produced by the methods as described herein. Furthermore, using activity guided purification, fractions of the composition are produced and combined in differing ratios so as to produce an active mixture.

In a further embodiment according to the invention, the composition according to this invention is used to increase infectivity of nematodes in field or greenhouse application of the nematodes by dissolving the composition in an aqueous medium to produce an aqueous EPN infectivity increasing composition. The aqueous EPN infectivity increasing composition is mixed with nematodes to increase the infectivity of the nematodes prior to field or greenhouse application of the nematodes. The nematodes, in a preferred embodiment, are maintained in contact with an aqueous EPN infectivity increasing composition according to this invention for a period of at least about 20 min prior to field or greenhouse application of the nematodes. In a further embodiment, the nematodes are filtered prior to field or greenhouse application.

Conditions for growing nematodes to produce EPN infectivity increasing composition: Growing nematodes in insects is considered as in vivo growth, growing nematodes outside the insect just with its symbiotic bacteria in liquid or solid media is considered as in vitro growth. For example, *Steinernema* or *Heterorhabditis* spp. (*Steinernema carpocapsae, Steinernema feitiae, Steinernema kraussei, Steinernema glaseri, Steinernema scapterisci, Steinernema riobrave, Steinernema kushidai, Steinernema scarabaei* or *Heterorhabditis bacteriophora, Heterorhabditis megidis, Heterorhabditis indica, Heterorhabditis marelata, Heterorhabditis zealandica, Heterorhabditis downesi*,) may be grown on *Galleria mellonella* larvae (wax worms, wax moth). The ratio of nematodes is 25-200 IJs per wax worm larvae. Other insect hosts can be used such as *Tenebrio molitor* (meal worms) larvae navel orangeworm (*Ameylois transitella*), tobacco budworm (*Heliothis virescens*), cabbage looper (*Trichoplusia ni*), pink bollworm (*Pectinophora gossypiella*), beet armyworm (*Spodoptera exigua*), corn earworm (*Helicoverpa zea*), gypsy moth (*Lymantria dispar*), house cricket (*Acheta domesticus*), and various beetles (Coleoptera). After two days, the infected larvae are placed into new 6 cm diameter petri dishes and the white trap method is used to collect IJs. It takes about 7-10 days from infection to emergence of IJs. Once IJs form and leave the cadavers (or 3 days after emergence of the IJs), cadavers are collected to extract pheromones.

A sample commercial package of nematodes contains 5 million Us. To treat such a package, pheromones need to be extracted from about 100-200 insect larvae infected with nematodes. The extract from 100 insect host cadavers is diluted in 20-60 ml of water and the extract from 200 insect host cadavers is diluted in 40-120 ml of water where a package of IJs is placed for 20 min for activation. This will be adjusted to other package sizes such as, for example, about 1 million, about 50 million, about 250 million, or about 3 billion IJ packages.

Alternatively, nematode IJs are introduced to a pure culture of their symbiont in a nutritive medium at optimum growth temperature in a solid agar medium or a liquid culture with aeration in shake flasks, stirred bioreactors, airlift bioreactors (Shapiro-Ilan, D. I., et al., J. Nematol., 44(2): 206-217 (2012); Inman III, F. L., et al., Indian J. Microbiol., 52: 316-324 (2012)). Media for in vitro approaches is preferably animal product based (e.g., pork kidney or chicken offal) or includes various ingredients such as peptone, yeast extract, eggs, soy flour, and lard. Exemplary in vitro medium recipes for solid or liquid fermentation are disclosed, for example, in McMullen II and Stock (McMullen II, J. G., and S. P. Stock, J. Vis. Exp., (91), e52096, doi:10.3791/52096 (2014)).

In vitro growth recipes are the same for both liquid and solid medium except for the agar. The liquid medium does not contain agar (at least not to the extent that the medium forms a solid), solid medium contains sufficient agar as the solidifying agent to form a solid.

For Liver-kidney Agar (for 500 ml): Beef liver (50 g), Beef kidney (50 g), Sodium chloride 2.5 g (0.5% final concentration), Agar 7.5 g (1.5% agar, final concentration), 500 ml distilled water.

For Lipid Agar (for 1 L): Nutrient broth (8 g), Yeast extract (5 g), Magnesium chloride hexahydrate 10 ml (0.2 g/ml), Corn oil 4 ml, Corn syrup 9 6 ml combine 7 ml corn syrup in 89 ml heated water and swirl for homogeneity, Agar (15 g), Distilled water (890 ml).

Nematode IJs are inoculated into liquid medium with a density between about 300-4,000 nematodes per ml at 25 or 28 degrees centigrade until nematodes reproduce and form IJs again (about 20-60% newly formed IJs). Such cultures may be synchronized cultures or unsynchronized cultures. Once new IJs are formed in the liquid cultures, nematodes are separated from the liquid medium. Then medium is centrifuged to remove the bacteria. The supernatant is frozen and lyophilized. The dry medium is extracted with alcohol and dried. Then it is extracted with water and dried. If the starting volume of the medium is 1 L, the dry extract is diluted with 1 L and can be diluted up to 3 L of water. A package of commercially available nematodes (3-5 million IJs) is treated with about 100 m 1 of the extract.

Other compounds may be added to the composition provided they do not substantially interfere with the intended activity and efficacy of the composition; whether or not a compound interferes with activity and/or efficacy can be determined, for example, by the procedures utilized below.

"Optional" or "optionally" means that the subsequently described event or circumstance may or may not occur, and that the description includes instances in which said event or circumstance occurs and instances where it does not. For example, the phrase "optionally comprising a carrier" means that the composition may or may not contain a carrier and that this description includes compositions that contain and do not contain a carrier Also, by example, the phrase "optionally adding a carrier" means that the method may or may not involve adding a carrier and that this description includes methods that involve and do not involve adding a carrier.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Rearing EPNs: The nematodes used in all experiments were cultured in vivo in last instar of the greater wax moth, *Galleria mellonella*, using the White trap method as described by Shapiro-Ilan et al. (2016). The nematodes were then stored in aqueous suspension in 250 ml tissue culture flasks at 10° C. until use.

Preparation of pheromone extract: *Steinernema* feltiae and *Steinernema* carpocapsae pheromones were obtained with a modified method of Kaplan et al. (2012). Pheromone was extracted from EPN infected and consumed *G. mellonella* grubs in 70% methanol. Infected cadavers were harvested within 10 days of *S. feltiae* infective juvenile (IJ) emergence. Then the cadavers were mixed with 70% methanol (one cadaver in 1 ml of 70% methanol) in an incubator shaker (New Brunswick Scientific) with a shaker speed of 150 rpm at room temperature for 10 minutes. The supernatant was collected by centrifugation at 5000 rcf (relative centrifugal force) for 15 min and dried in a rotary evaporator. The extract was then resuspended in 10× concentration using purified water (ELGA Purelab Ultra, High Wycombe, UK) and centrifuged at 6,000 rcf for 15 minutes. The supernatant was lyophilized in a Labconco Freezer Dryer (Labconco floor model Casscade FreeZone 12L, Kansas City, MO) and then stored at −80° C. as dry powder.

Desensitization of EPNs to Pheromones: Prior to experimentation, all nematodes went through a desensitization process to remove any residual pheromones from the in vivo cultures. Approximately 10 ml of EPNs from culture flasks were placed in 15 ml centrifuge tubes and centrifuged at 2000 rpm for 2 min. The supernatant was then discarded, and 10 ml of $dH_2O$ was added to each tube. Subsequently, each tube was shaken, and another round of centrifugation followed. This process was repeated twice more, for a total of three washes. The final supernatant was discarded and the desensitized EPN pellet was resuspended in $dH_2O$. EPNs were again stored in culture flasks at 10° C. for 7 days prior to experimentation.

Infectivity assays: The basic approach to distinguish treatment effects was to expose one half of the nematode infective juveniles (IJs) to pheromones (from their own species) and the other half to tap water only (i.e., the control nematodes); subsequently, infectivity of the IJs was assessed. The treated and control nematodes were exposed to last instar *G. mellonella* in small arenas that negate dispersal because nematode movement is physically restricted (i.e., 2 ml Eppendorf tubes) (Willett, D. S., et al., PLOS ONE, 13(10): e0205804 (2018)). Specifically, to rule out the possibility of increased infection being due to increased insect host encounter, we reduced the distance between nematodes and the insect host. Thus, all the IJs, (pheromone treated and control) had an equal opportunity to access the insect host and invade. The tubes contained 0.650 grams of oven dried sand. Approximately 1,000 IJs of *S. carpocapsae* or *S. feltiae* were added to each tube in a 0.040 ml volume. The pheromone-treated IJs had been exposed to conspecific pheromones for 20 min prior to the assay whereas control nematodes were only exposed to water (for the same amount of time). Half the tubes were then incubated for 4 hours at 25° C. and the other half was exposed in the same manner and incubated for 24 hours at 25° C. To illustrate that the enhanced infectivity phenomenon is not restricted to a single insect host, we conducted the same infectivity assays using the citrus root weevil, *Diaprepes abbreviatus*. Thereby, we used insect hosts from two different orders (*G. mellonella* is in the order Lepidoptera and *D. abbreviatus* is in the order Coleoptera). The procedures for testing infectivity of *S. feltiae* and *S. carpocapsae* in *D. abbreviatus* were the same as described above for *G. mellonella*, except that for *D. abbreviatus*, all tubes were incubated at 24 hours at 25° C. (a 4-hour incubation was not conducted).

After the incubation period, all insects were dissected and the number of invading IJs was recorded (Shapiro and Lewis, 1999; Wu et al., 2017). There were 20 replicate insects for each nematode species and exposure interval, and the entire experiment was repeated once in time (thus two trials with a total of 80 insects per nematode species). Treatment effects were assessed by analysis of variance (ANOVA) with Tukey's test, and also confirmed by t-test (SAS User's guide 9.3., Cary, NC, 2011). Data were square-root transformed prior to analysis (SAS, 2011); non-transformed means are presented in the figures.

Concentration curve: To illustrate that the enhanced infectivity phenomenon is not restricted to a single exposure concentration, a concentration-response assay was implemented. Methods were as described above for the infectivity tests with the host *Galleria mellonella*. The nematode used to model the concentration curve was *Steinernema carpocapsae*. Briefly, IJs were treated with pheromone extracts for 20 min prior to the assay and then exposed to *G. mellonella* larvae in 2 ml Eppendorf tubes for 24 hours, at which time the number of invading IJs was assessed by dissection (as described above). The concentration of pheromone extract varied. As described above, based on prior observations and experiments (as described above) a standard effective dose is considered to be 100 insect host cadaver equivalents diluted in 20-60 ml of water. Thus, the 1× concentration in this assay was established by diluting 100 cadaver equivalents in 44 ml of water. The range of concentrations tested was 0 (=control, no pheromone extract), 0.25×, 0.5×, 1×, 2×, and 4× relative to the standard. There were ten replicate insects for each concentration. A linear regression analysis was conducted to determine the relationship between pheromone extract concentration and IJ invasion (SAS, 2011).

Figure 2B:
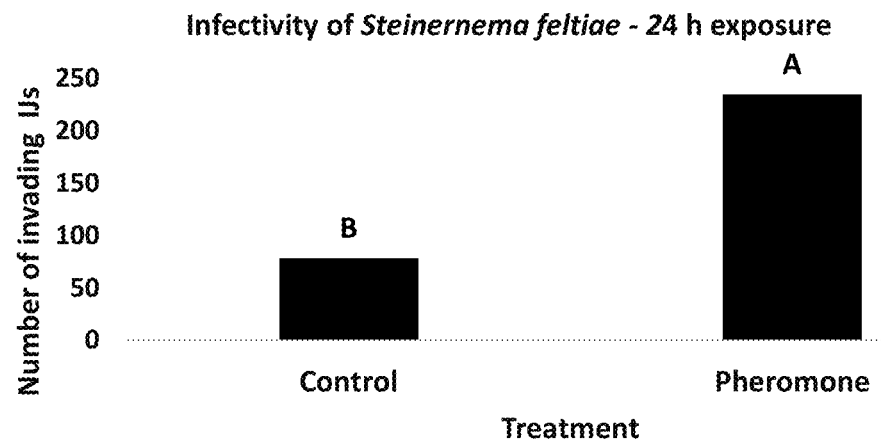

Results, Infectivity assays: For the *G. mellonella* assays, there was no statistical interaction between trial effect and treatment effect, so trials were combined (P=0.4272 and 0.2694 for *S. carpocapsae* at 4 and 24 h exposure, respectively, and P=0.4478 and 0.4753 for *S. feltiae* at 4 and 24 h exposure, respectively). Surprisingly, the number of *S. carpocapsae* IJs that invaded the host was significantly higher in the pheromone treatment than the control (no pheromone) at 4 hours (FIG. 1A; F=25.47; df=1.76; P<0.0001) and 24 hours of exposure (FIG. 1B; F=27.34; df=1.76; P<0.0001); similarly, the number of *S. feltiae* IJs that invaded the host was significantly higher in the pheromone treatment than the control (no pheromone) at 4 hours (FIG. 2A; F=25.32; df=1.74; P<0.0001) and 24 hours of exposure (FIG. 2B; F=53.21; df=1.76; P<0.0001). Additionally, in all tests for *S. carpocapsae* and *S. feltiae*, t-tests surprisingly indicated higher infectivity in the pheromone treated IJs than in control IJs (P<0.0001 for all four tests).

Figure 3:
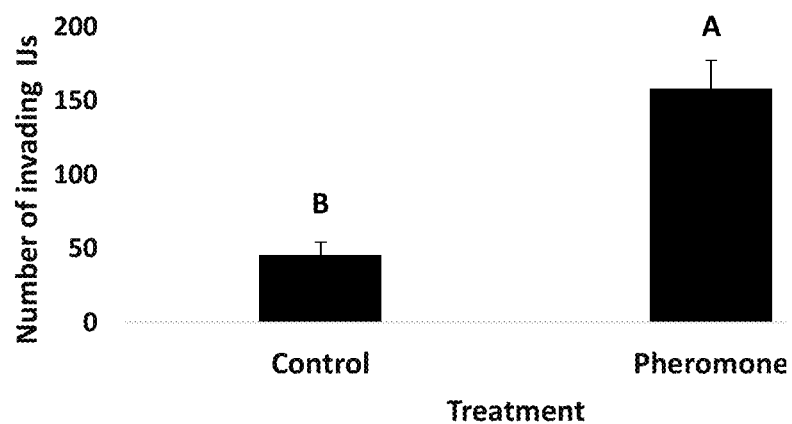
Figure 3:
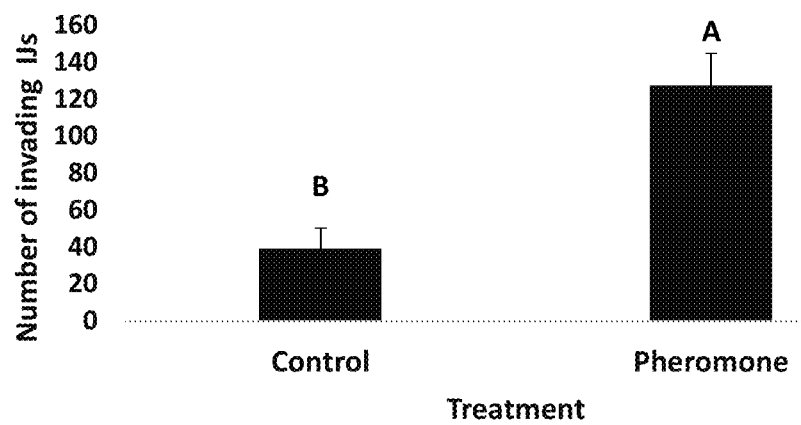

For *Diaprepes abbreviatus*, there was no significant interaction between trial effect and treatment effect, so trials were combined (p=0.0.9466 and 0.0.7986 for *S. carpocapsae* and *S. feltiae*, respectively). The number of *S. carpocapsae* and *S. feltiae* IJs that invaded the host was significantly higher in the pheromone treatment than the control at 24 hour of exposure (F=33.91; df=1.76; p<0.0001 for *S. carpocapsae* and F=35.28; df=1.76; p<0.0001 for *S. feltiae*) (FIG. 3). Additionally, t-tests for *S. carpocapsae* and *S. feltiae* indicated higher infectivity in the pheromone-treated IJs than in control IJs (t=−5.85 and −6.01 for *S. carpocapsae* and *S. feltiae*, respectively; df=78 and p<0.0001 for both tests).

Figure 4:
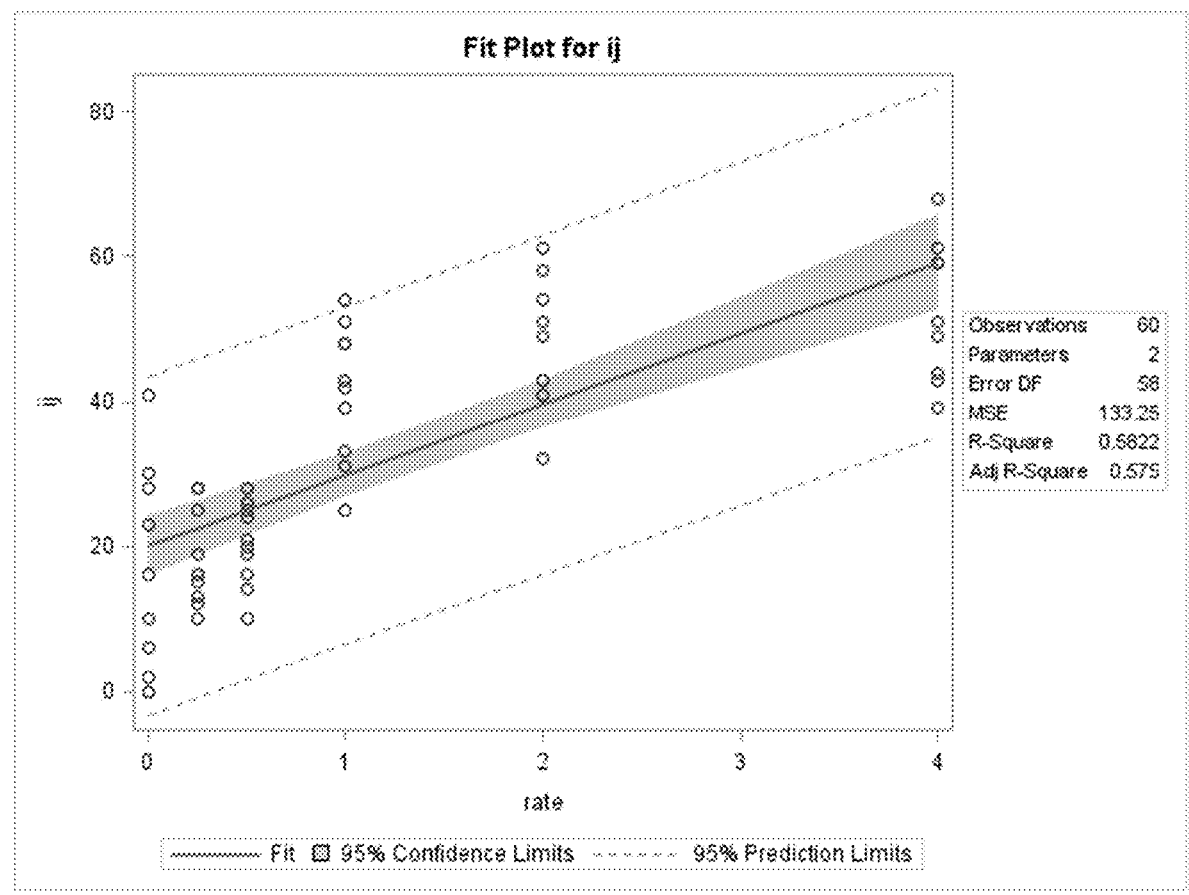

Results. Concentration curve: There was a statistically significant positive linear relationship between pheromone extract concentration and the number of IJs invading the insect host (F=80.83; df=1, 58; p<0.0001; R-Square=0.58) (FIG. 4). The equation for the relationship is Y=9.8X+20, where Y is the number of invading IJs, X is the pheromone concentration).

Discussion: Our results surprisingly indicated that conspecific dispersal pheromones of *S. carpocapsae* and *S. feltiae* increase infectivity. Thus, exposure of EPNs to pheromones prior to application will enhance biocontrol efficacy in two important attributes: dispersal to the host and invasion into the host. Given that enhanced infectivity was observed in both nematodes species, the results indicated that the pheromones effects impact nematodes having different foraging strategies. Additionally, the enhanced infectivity was surprisingly observed in hosts of different orders and therefore indicates impact across broad pest species. Moreover, a positive linear relationship was surprisingly demonstrated between the concentration of pheromone extract and the level of increase in infectivity response. In addition to enhancing biocontrol applications for suppression of insect pests, the pheromones can be used to improve EPN infectivity for other purposes. For example, several companies produce EPNs commercially in vivo; enhanced infectivity would lead to increased efficiency in production and lower inoculum rates would be required. Moreover, certain insect pests that are resistant to infection due to physiological or physical deterrents (Eidt, D., and G. Thurston, The Canadian Entomologist, 127: 423-429 (1995); Shapiro-Ilan et al., 2017) may become more susceptible when exposed to IJs that are stimulated by pheromone exposure.

All of the references cited herein, including U.S. patents and U.S. patent application Publications, are incorporated by reference in their entirety. Also incorporated by reference in their entirety are the following references: Shapiro-Ilan, D. I., et al., In vivo production of entomopathogenic nematodes, In: T. Glare and M. Moran-Diez (Eds.), Microbial-Based Biopesticides—Methods and Protocols (part of a book series: Methods in Molecular Biology), Human Press, pp. 137-158, 2016; WO 2017/120252.

Thus, in view of the above, there is described (in part) the following:

A method for increasing infectivity of entomopathogenic nematodes in any target area for the purposes of insect control, said method comprising (or consisting essentially of or consisting of):

(a) mixing an effective entomopathogenic nematode infectivity increasing amount of an aqueous nematode infectivity increasing composition with (i) entomopathogenic nematodes to activate said entomopathogenic nematodes for increased infectivity prior to application of said entomopathogenic nematodes to said target area, or (ii) seeds to produce coated seeds, and (b) applying said entomopathogenic nematodes to said target area or planting said coated seeds in said target area;

wherein said aqueous nematode infectivity increasing composition is produced by a method comprising (or consisting essentially of or consisting of):

(i) obtaining a nutrient depleted nematode growth medium selected from the group consisting of liquid broth, agar medium or other solid substrate, and insect host cadaver, depleted of nutrients by growing entomopathogenic nematodes;

(ii) producing an alcohol-growth medium mixture by adding an alcohol to said growth medium to achieve a final concentration of between about 10% to about 90% of said alcohol in said growth medium;

(iii) centrifuging said alcohol-growth medium mixture to remove solid or insoluble matter while maintaining a supernatant from said centrifuging;

(iv) drying the supernatant from said centrifuging to produce a dry extract;

(v) resuspending said dry extract in an aqueous medium to produce a water-soluble pheromone extract; and (vi) centrifuging said water-soluble pheromone extract to remove water-insoluble compounds while maintaining a water soluble supernatant to produce an aqueous nematode infectivity increasing composition; and (vii) optionally drying said aqueous nematode infectivity increasing composition to produce a dry nematode infectivity increasing composition and subsequently dissolving said dry nematode infectivity increasing composition in an aqueous medium to produce an aqueous nematode infectivity increasing composition.

The above method, wherein said alcohol is selected from the group consisting of ethanol, methanol, and mixtures thereof.

The above method, wherein said growth medium is selected from the group consisting of a growth medium in which non-pathogenic bacterivore nematodes or insect or entomopathogenic nematodes have been grown.

The above method, wherein said aqueous nematode infectivity increasing composition is the sole component that increases nematode infectivity.

A method for increasing infectivity of entomopathogenic nematodes in any target area for the purposes of insect control, said method comprising (or consisting essentially of or consisting of):

(a) mixing an effective entomopathogenic nematode infectivity increasing amount of an aqueous nematode infectivity increasing composition with (i) entomopathogenic nematodes to activate said entomopathogenic nematodes for increased infectivity prior to application of said entomopathogenic nematodes to said target area, or (ii) seeds to produce coated seeds, and (c) applying said entomopathogenic nematodes to said target area or planting said coated seeds in said target area;

wherein said aqueous nematode infectivity increasing composition is produced by a method comprising (or consisting essentially of or consisting of):

(i) obtaining a nutrient depleted nematode growth medium selected from the group consisting of liquid broth, agar medium or other solid substrate, and insect host cadaver, depleted of nutrients by growing entomopathogenic nematodes;

(ii) producing an alcohol-growth medium mixture by adding an alcohol to said growth medium to achieve a final concentration of between about 10% to about 90% of said alcohol in said growth medium;

(iii) centrifuging said alcohol-growth medium mixture to remove solid or insoluble matter while maintaining a supernatant from said centrifuging;

(iv) drying the supernatant from said centrifuging to produce a dry extract;

(v) resuspending said dry extract in an aqueous medium to produce a water-soluble pheromone extract; and (vi) centrifuging said water-soluble pheromone extract to remove water-insoluble compounds while maintaining a water soluble supernatant to produce an aqueous nematode infectivity increasing composition.

The above method, wherein said alcohol is selected from the group consisting of ethanol, methanol, and mixtures thereof.

The above method, wherein said growth medium is selected from the group consisting of a growth medium in which non-pathogenic bacterivore nematodes or insect or entomopathogenic nematodes have been grown.

The above method, wherein said aqueous nematode infectivity increasing composition is the sole component that increases nematode infectivity.

A method of producing an aqueous nematode infectivity increasing composition which comprises (or consists essentially of or consists of):

(i) obtaining a nutrient depleted nematode growth medium selected from the group consisting of liquid broth, agar medium or other solid substrate, and insect host cadaver, depleted of nutrients by growing entomopathogenic nematodes;

(ii) producing an alcohol-growth medium mixture by adding an alcohol to said growth medium to achieve a final concentration of between about 10% to about 90% of said alcohol in said growth medium;

(iii) centrifuging said alcohol-growth medium mixture to remove solid or insoluble matter while maintaining a supernatant from said centrifuging;

(iv) drying the supernatant from said centrifuging to produce a dry extract;

(v) resuspending said dry extract in an aqueous medium to produce a water-soluble pheromone extract;

(vi) centrifuging said water-soluble pheromone extract to remove water-insoluble compounds while maintaining a water soluble supernatant to produce an aqueous nematode infectivity increasing composition.

An aqueous nematode infectivity increasing composition prepared by the above method.

A method for increasing infectivity of entomopathogenic nematodes in any target area for the purposes of insect control, said method comprising (or consisting essentially of or consisting of):

(a) dissolving a dry nematode infectivity increasing composition in an aqueous medium to produce an effective entomopathogenic nematode infectivity increasing amount of an aqueous nematode infectivity increasing composition, (b) mixing said aqueous nematode infectivity increasing composition with (i) entomopathogenic nematodes to activate said entomopathogenic nematodes for increased infectivity prior to application of said entomopathogenic nematodes to said target area, or (ii) seeds to produce coated seeds, and (c) applying said entomopathogenic nematodes to said target area or planting said coated seeds in said target area;

wherein said dry nematode infectivity increasing composition is produced by a method comprising (or consisting essentially of or consisting of):

(i) obtaining a nutrient depleted nematode growth medium selected from the group consisting of liquid broth, agar medium or other solid substrate, and insect host cadaver, depleted of nutrients by growing entomopathogenic nematodes;

(ii) producing an alcohol-growth medium mixture by adding an alcohol to said growth medium to achieve a final concentration of between about 10% to about 90% of said alcohol in said growth medium;

(iii) centrifuging said alcohol-growth medium mixture to remove solid or insoluble matter while maintaining a supernatant from said centrifuging;

(iv) drying the supernatant from said centrifuging to produce a dry extract;

(v) resuspending said dry extract in an aqueous medium to produce a water-soluble pheromone extract;

(vi) centrifuging said water-soluble pheromone extract to remove water-insoluble compounds while maintaining a water soluble supernatant; and (vii) drying (e.g., freeze drying) said water-soluble supernatant to produce a dry nematode infectivity increasing composition.

The above method, wherein said alcohol is selected from the group consisting of ethanol, methanol, and mixtures thereof.

The above method, wherein said growth medium is selected from the group consisting of a growth medium in which non-pathogenic bacterivore nematodes or insect or entomopathogenic nematodes have been grown.

The above method, wherein said dry nematode infectivity increasing composition is the sole component that increases nematode infectivity.

A method of producing a stable dry nematode infectivity increasing composition which comprises (or consists essentially of or consists of):

(i) obtaining a nutrient depleted nematode growth medium selected from the group consisting of liquid broth, agar medium or other solid substrate, and insect host cadaver, depleted of nutrients by growing entomopathogenic nematodes;

(ii) producing an alcohol-growth medium mixture by adding an alcohol to said growth medium to achieve a final concentration of between about 10% to about 90% of said alcohol in said growth medium;

(iii) centrifuging said alcohol-growth medium mixture to remove solid or insoluble matter while maintaining a supernatant from said centrifuging;

(iv) drying the supernatant from said centrifuging to produce a dry extract;

(v) resuspending said dry extract in an aqueous medium to produce a water-soluble pheromone extract;

(vi) centrifuging said water-soluble pheromone extract to remove water-insoluble compounds while maintaining a water soluble supernatant; and (vii) drying said water-soluble supernatant to produce a stable dry nematode infectivity increasing composition.

A stable dry nematode infectivity increasing composition prepared by the above method.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41(1): 46-47 (2013): " . . . Written support for a negative limitation may also be argued through the absence of the excluded element in the specification, known as disclosure by silence . . . . Silence in the specification may be used to establish written description support for a negative limitation. As an example, in Ex parte Lin [No. 2009-0486, at 2, 6 (B.P.A.I. May 7, 2009)] the negative limitation was added by amendment . . . . In other words, the inventor argued an example that passively complied with the requirements of the negative limitation . . . was sufficient to provide support . . . . This case shows that written description support for a negative limitation can be found by one or more disclosures of an embodiment that obeys what is required by the negative limitation . . . ."

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method of producing a stable dry nematode infectivity-increasing composition which comprises:

(i) obtaining a nutrient-depleted nematode growth medium by growing non-pathogenic bacterivore nematodes, insect nematodes, or entomopathogenic nematodes in a growth medium selected from liquid broth, agar medium, other solid substrate, or at least one insect host cadaver;

(ii) producing an alcohol-nutrient-depleted nematode growth medium mixture by adding alcohol to said nutrient-depleted nematode growth medium to a final concentration of between about 10% to about 90% of said alcohol in said nutrient-depleted nematode growth medium and shaking for about 10 minutes at room temperature;

(iii) centrifuging said alcohol-nutrient-depleted nematode growth medium mixture to remove solid or insoluble matter while maintaining a supernatant from said centrifuging;

(iv) drying the supernatant from said centrifuging using a rotary evaporator to produce a dry extract;

(v) resuspending said dry extract in an aqueous medium to produce a water-soluble pheromone extract;

(vi) centrifuging said water-soluble pheromone extract to remove water-insoluble compounds while maintaining a water-soluble supernatant; and (vii) drying said water soluble supernatant;

to produce a stable dry nematode infectivity-increasing composition.

2. The method of claim 1, wherein said alcohol is ethanol, methanol, or a mixture thereof.

3. The method of claim 1, wherein said nutrient-depleted nematode growth medium is a growth medium in which entomopathogenic nematodes have been grown.

4. A method of producing an aqueous nematode infectivity-increasing composition which comprises:

(i) preparing a stable dry nematode infectivity-increasing composition by the method of claim 1; and (ii) dissolving said dry nematode infectivity-increasing composition in an aqueous medium to produce an aqueous nematode infectivity-increasing composition.

5. The method of claim 4, wherein said alcohol is ethanol, methanol, or a mixture thereof.

6. The method of claim 4, wherein said nutrient-depleted nematode growth medium is a growth medium in which entomopathogenic nematodes have been grown.

* * * * *